United States Patent
Soccard

(10) Patent No.: US 10,773,475 B2
(45) Date of Patent: Sep. 15, 2020

(54) PROCESS FOR MANUFACTURING A THERMOPLASTIC COMPOSITE PART

(71) Applicant: AIRBUS SAS, Blagnac (FR)

(72) Inventor: Eric Soccard, Blain (FR)

(73) Assignee: Airbus SAS, Blagnac (FR)

( * ) Notice: Subject to any disclaimer, the term of this patent is extended or adjusted under 35 U.S.C. 154(b) by 642 days.

(21) Appl. No.: 15/103,679

(22) PCT Filed: Dec. 12, 2014

(86) PCT No.: PCT/EP2014/077626
§ 371 (c)(1),
(2) Date: Jun. 10, 2016

(87) PCT Pub. No.: WO2015/086834
PCT Pub. Date: Jun. 18, 2015

(65) Prior Publication Data
US 2016/0311180 A1     Oct. 27, 2016

(30) Foreign Application Priority Data
Dec. 13, 2013   (FR) ..................... 13 62566

(51) Int. Cl.
*B29C 70/54* (2006.01)
*B29C 70/88* (2006.01)
(Continued)

(52) U.S. Cl.
CPC ............ *B29C 70/541* (2013.01); *B29C 33/16* (2013.01); *B29C 70/30* (2013.01); *B29C 70/885* (2013.01);
(Continued)

(58) Field of Classification Search
CPC ....... B29C 70/541; B29C 71/02; B29C 70/30; B29C 33/16; B29C 70/885;
(Continued)

(56) References Cited

U.S. PATENT DOCUMENTS

| | | | | |
|---|---|---|---|---|
| 4,681,712 A | * | 7/1987 | Sakakibara | B29C 37/0032 264/104 |
| 5,915,586 A | * | 6/1999 | Palazzo | B65D 90/505 220/4.13 |
| 2009/0130304 A1 | * | 5/2009 | Muth | B05D 7/542 427/180 |

FOREIGN PATENT DOCUMENTS

| | | | |
|---|---|---|---|
| EP | 2159039 | 3/2010 | |
| EP | 2159039 A1 * | 3/2010 | ............. B29C 33/16 |

(Continued)

OTHER PUBLICATIONS

International Search Report, International Application No. PCT/EP2014/077626, dated Mar. 24, 2015.

*Primary Examiner* — Michael N Orlando
*Assistant Examiner* — Christian Roldan
(74) *Attorney, Agent, or Firm* — Greer, Burns & Crain Ltd.

(57) ABSTRACT

This process for producing a thermoplastic composite part by laying of at least one thermoplastic composite layer on a tool includes laying on the tool a hardened first ply before the laying of the thermoplastic composite layer. The first ply is produced beforehand to the shape of the tool and includes a first material able to experience an attractive force when it is subjected to a magnetic field, and/or to an electrical potential difference, and includes a second material of a thermoplastic resin that is chemically compatible with the resin of the thermoplastic composite layer. The first ply is clamped to the tool by the effect of a magnetic field, and/or of an electrical potential difference, established at the level of the tool. In one form of implementation, the first ply is produced on a first-ply mold that is preferably of convex shape.

12 Claims, 3 Drawing Sheets

(51) Int. Cl.
*B29C 33/16* (2006.01)
*B29C 70/30* (2006.01)
*B29C 71/02* (2006.01)
B29K 101/12 (2006.01)
B29K 705/00 (2006.01)
B29K 105/00 (2006.01)
B29L 9/00 (2006.01)

(52) U.S. Cl.
CPC ........ *B29C 71/02* (2013.01); *B29C 2791/001* (2013.01); *B29K 2101/12* (2013.01); *B29K 2105/251* (2013.01); *B29K 2705/00* (2013.01); *B29K 2713/00* (2013.01); *B29K 2995/0008* (2013.01); *B29L 2009/003* (2013.01)

(58) Field of Classification Search
CPC ......... B29C 2791/001; B29L 2009/003; B29K 2105/251; B29K 2995/0008; B29K 2713/00; B29K 2705/00; B29K 2101/12
USPC ....................................................... 156/272
See application file for complete search history.

(56) References Cited

FOREIGN PATENT DOCUMENTS

FR  2881371   8/2006
JP  05261849  10/1993

\* cited by examiner

PROCESS FOR MANUFACTURING A THERMOPLASTIC COMPOSITE PART

CROSS REFERENCE TO RELATED APPLICATIONS

This application is the National Stage of International Application No. PCT/EP2014/077626, having an International Filing Date of 12 Dec. 2014, which designated the United States of America, and which International Application was published under PCT Article 21(2) as WO Publication No. 2015/086834 A1, and which claims priority from, and the benefit of, French Application No. 1362566, filed on 13 Dec. 2013, the disclosures of which are incorporated herein by reference in their entireties.

BACKGROUND

1. Field

The presently disclosed embodiment belongs to the field of composites including a succession of superposed plies forming the thickness of a composite part.

More particularly, the presently disclosed embodiment relates to a process for producing a composite part formed by a stack of plies laid on a matrix or a mold giving a shape to the part.

More particularly, the presently disclosed embodiment provides a solution to the laying of the first ply deposited on the mold.

2. Brief Description of Related Developments

When a composite part including resin-impregnated fibers is produced on a mold, it must be taken into consideration that the part will have to be demolded, i.e. separated from the mold, when all the desired plies have been laid and consolidated by known processes.

In the case of thermoplastic composites, i.e. composites the resin impregnating the fibers of which is hard at the temperature of use and softens when temperature is increased to a sufficient thermoplastic forming value, each laid ply adheres to the preceding ply on which it is deposited. To maintain the first ply on the mold, in the absence of a tack of the resin that will allow the ply to adhere to the surface of the mold, it is known to clamp the first ply deposited on a mold. Such a solution is effective when the shape of the mold is convex but does not make it possible to guarantee, in the case of a mold of concave shape, that the first ply will perfectly follow the shape of the mold.

As a result, thermoplastic composite parts of complex shapes produced on a mold including, even if only locally, concave shapes are tricky to produce and there are no solutions that are industrially satisfactory under such conditions.

SUMMARY

The presently disclosed embodiment precisely proposes a process that makes it possible to overcome the constraints of known solutions for producing a thermoplastic composite part by laying layers of material on a tool giving the part its shape.

In this process for producing a thermoplastic composite part by laying of at least one thermoplastic composite layer on a tool, a step is implemented of laying on the tool a first ply, laid on the tool before the laying of the thermoplastic composite layer. This first ply is a hardened ply produced beforehand to match the shape of the tool and including a first material able to experience an attractive force when it is subjected to a magnetic field, and/or to an electrical potential difference, and including a second material of a thermoplastic resin that is chemically compatible with the resin of the thermoplastic composite layer in order to adhere with said resin, this first ply being clamped to the tool in the step of laying this first ply on the tool by the effect of a magnetic field established at the level of the tool, and/or of an electrical potential difference between the tool and the first ply.

Thus the clamping of the first ply to the tool is achieved without chemical bonding and the ply is therefore perfectly demoldable and adheres perfectly to the tool at every point of its area because of the homogeneity of the magnetic attraction and/or of the force resulting from the potential difference produced on the first ply, and it is thereby possible to lay composite layers on the free surface of the first ply with a perfect adherence without the first ply moving or deforming on the tool.

According to one method of implementation, the second material is deposited on said first material in the form of a thermoplastic-resin powder, then the first material and the second material are subjected, clamped on a first-ply mold, in a step of manufacturing the first ply, to a step in which temperature is increased above a melting point and glass transition temperature of the thermoplastic resin, the shape of the first-ply mold being a counterpart of the tool.

Thus, a relatively thin hardened first ply that preserves the shape of the first-ply mold and therefore the shape of the tool, and that may then be placed on the tool in order to be clamped thereto and receive the thermoplastic composite layers, is produced.

In one mode of implementation of the process, the first material is deposited on the first-ply mold in a first step and, in a second step, the second material is deposited by spraying thermoplastic-resin powder onto the first material deposited on the first-ply mold.

In this method for producing the first ply, the thermoplastic resin may be uniformly distributed over the first material and with a controllable area density to obtain the desirable amount of thermoplastic resin, in order to give, to the first ply, after the temperature increase, the desired solidity and thermoplastic-layer binding qualities.

The first material mainly consists of woven or nonwoven wires and/or of mats, and/or of powders, that are deposited to form one or more superposed layers.

It is thus possible to form the first material on the first-ply mold by laying webs of wires or wovens or interlaced fibers the flexibility of which allows the curvatures of the first-ply mold to be followed, while obtaining a desired resultant solidity and thickness. The deposition of a material made of powder allows a uniform layer to be deposited on the first-ply mold. In this case the powder of the first material may be sprayed in mixture with the thermoplastic-resin powder of the second material, or even coated with the resin of the second material. These various methods may be combined, in particular to take into account local first-ply characteristics dictated by the shape of the part to be produced.

In one aspect, the first material is deposited on the first-ply mold in widths juxtaposed with a minimum overlap to avoid a gap between the neighboring edges of two juxtaposed widths.

It is thus possible to lay the first material in strips of dimensions smaller than a width of the first-ply mold, this on the one hand proving to be easier when the mold is of large width, and on the other hand allowing the first material to be better matched to non-developable mold shapes.

When the second material is deposited on the first material, advantageously a thermoplastic-resin powder electrostatic-spraying process is implemented.

The first material is advantageously formed from a ferromagnetic material, for example a metal such as a steel, a ferritic stainless steel or a nickel-containing alloy, chosen for its electrical conduction and/or magnetic properties.

In one method of implementation, the first ply is produced in at least two portions that are juxtaposed on the tool when the first ply is laid on the tool. It is thus possible to produce, for parts of large size, a first ply the portions of which remain of sizes compatible with the production and manipulation of a thin element.

Advantageously, when the first ply is produced in a plurality of portions, the constituent portions of the first ply are defined so as each to be produced on partial first-ply molds of mainly convex shape.

It is thus possible to produce each portion under deposition conditions such that the first material is deposited on a convex mold, this in practice proving to be less complex and less constraining in terms of clamping, if a mechanical clamp is used, but also in terms of the tensioning required to prevent defects in adherence to the mold.

The first material is for example clamped to the first-ply mold, in the step of manufacturing said first ply, by the effect of a magnetic field established at the level of said first-ply mold, and/or of an electrical potential difference relative to the first-ply mold.

An effective clamp is thus obtained by exploiting the electrical conduction and/or magnetic properties of the first material, these properties moreover being required to maintain the first ply on the tool.

To prevent the first ply from moving on the tool during the deposition of the thermoplastic composite layers of the part, the first ply is maintained clamped on the tool by the effect of a magnetic field established at the level of said tool, and/or of an electrical potential difference relative to the tool, during the laying of the thermoplastic composite layers superposed on the first ply.

When the thermoplastic composite layers required to form the part have been deposited, the magnetic field, and/or the potential difference, established at the level of the tool is cancelled, and if needs be reversed, in the step of demolding the part produced on the tool.

The forces ensuring the clamping are thus cancelled, a reversal of the magnetic field and/or of the clamping potential difference cancelling if needs be a cancellation of the residual forces resulting from a hysteresis effect, so that the part may be demolded without adherence to the tool making this demolding difficult and without the risk of damage that adherence of the resin to the tool could induce.

DESCRIPTION OF THE DRAWINGS

The description and the drawings of an exemplary implementation of the presently disclosed embodiment will allow the aims and advantages of the presently disclosed embodiment to be better understood. It is clear that this description is given by way of example, and is non-limiting in character.

In the drawings.

DETAILED DESCRIPTION

Figure 1:
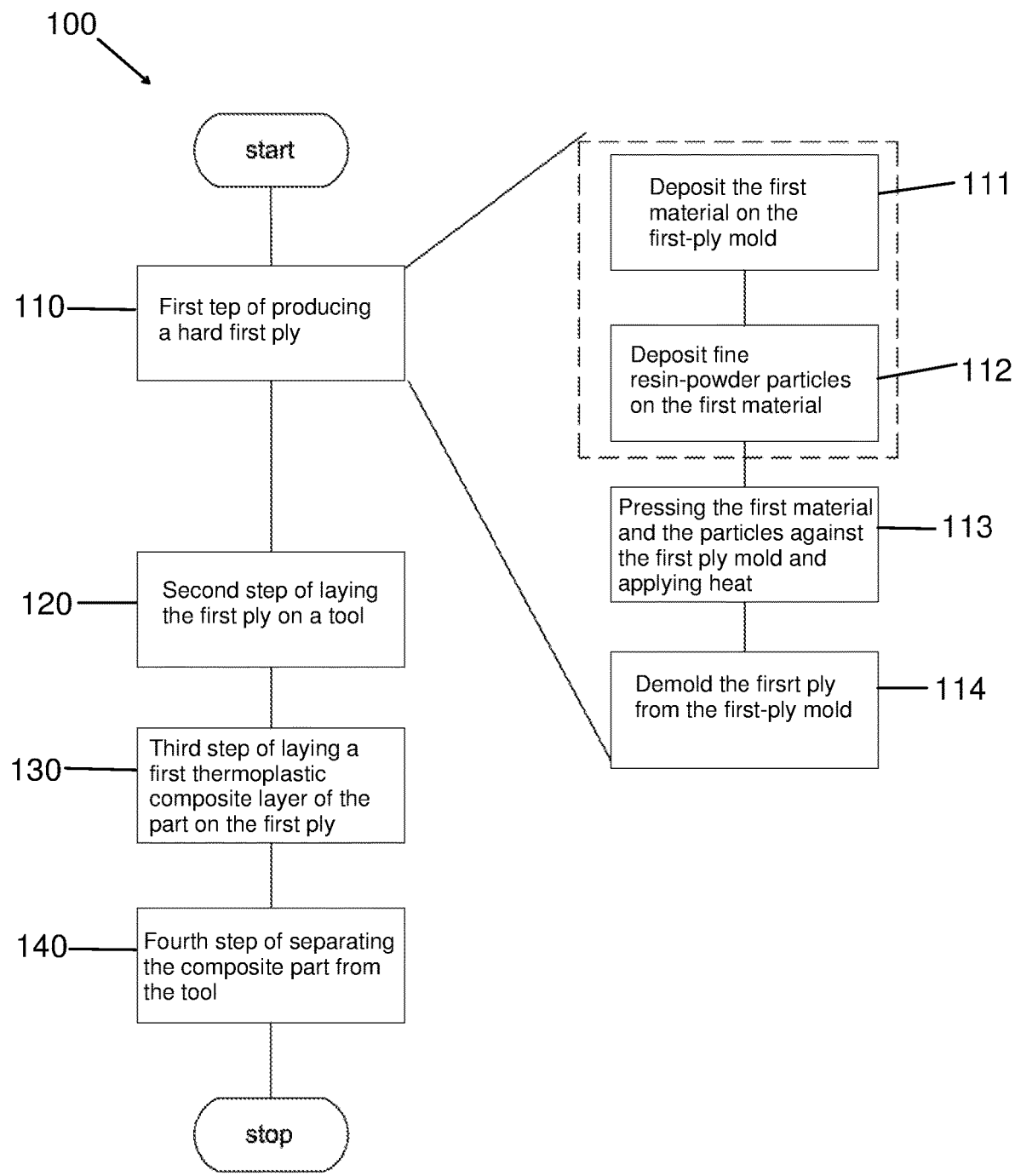
FIG. 1 illustrates the main steps of the process for one mode of implementation.

FIG. 1 synoptically shows the main steps of the process of the presently disclosed embodiment.

Figure 2A:
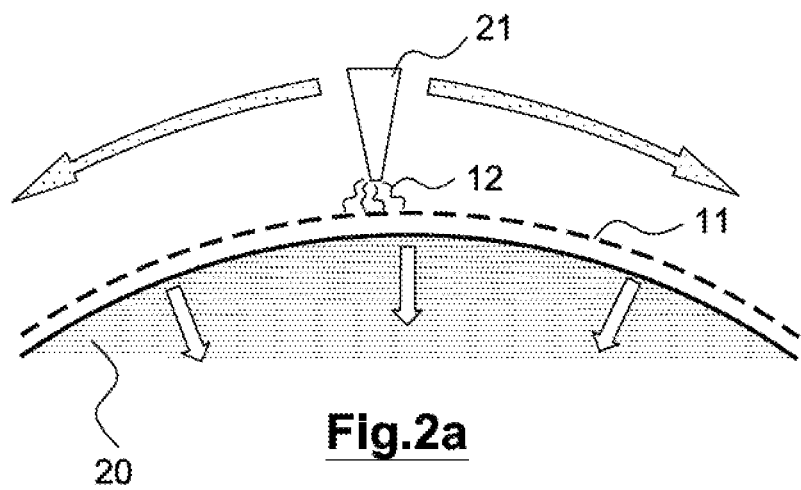
FIG. 2a schematically illustrates the retention, of the first material of a first ply on a first-ply mold and the spraying of the second thermoplastic-resin powder material onto the first material.
Figure 2B:
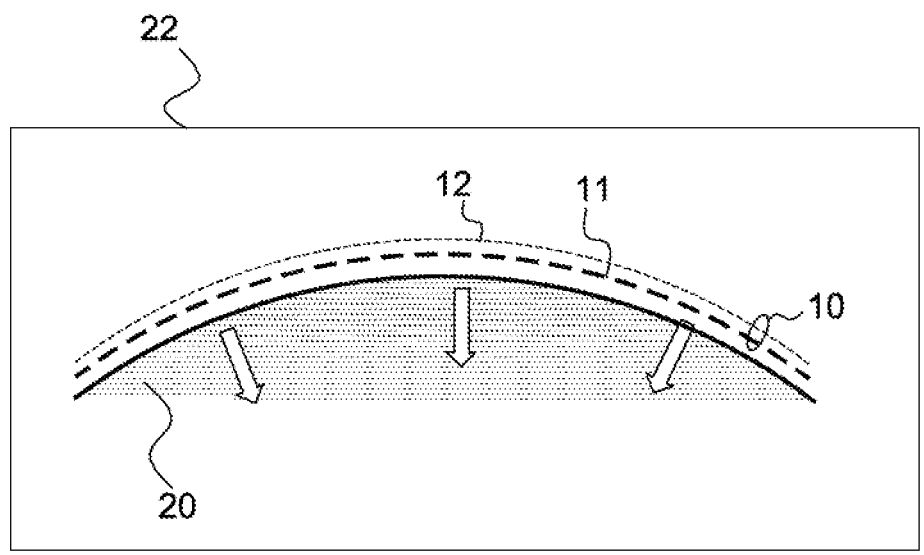
FIG. 2b schematically illustrates the step of melting the second thermoplastic-resin powder material in a heated chamber.
Figure 2C:
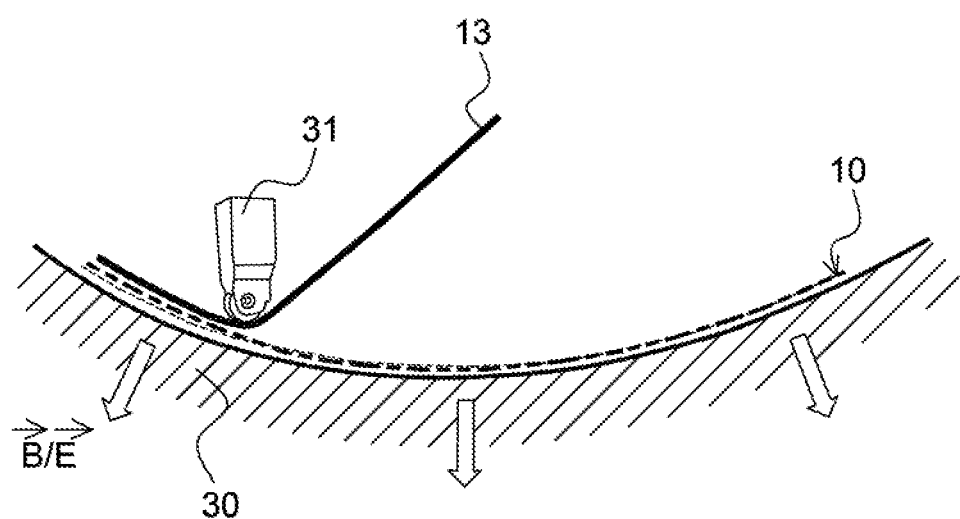
FIG. 2c schematically illustrates the laying of a thermoplastic layer to produce the part on the first ply retained on a tool by magnetic forces established at the level of the tool and/or generated by a potential difference.

FIGS. 2a, 2b and 2c schematically illustrate an exemplary implementation of the process.

In the process 100, a first step 110 for producing a thermoplastic composite part including a stack of layers 13 includes producing a hard first ply 10 having, on the one hand, physical properties allowing it to temporarily and reversibly adhere to a tool 30 on which the part must be formed and, on the other hand, physico-chemical properties that allow it to bind with the thermoplastic resin of those layers of the part which must be deposited on said first ply.

The first ply 10 is produced on a first-ply mold 20.

The first ply 10 is produced with a shape that is as close as possible if not identical to the shape of the tool 30 on which the thermoplastic composite layers from which the part must be formed must be laid.

Furthermore, the first ply is as thin as possible so that its thickness is relatively small relative to the thickness of the part to be produced.

The first-ply mold 20 is of a shape suitable for facilitating the production and demolding of the first ply 10 from said first-ply mold. In particular, if the part to be produced is mainly concave, the first-ply mold 20 will have a complementary, mainly convex shape.

To produce the first ply 10, a complex is formed including at least one first material 11 having electromagnetic properties and at least one second material 12 of a thermoplastic resin.

In a first step 111 of the production of the first ply, the first material 11 is deposited on the first-ply mold 10, the shape of which first-ply mold is a geometric counterpart of the tool 30 on which the part must be formed of the part.

The first material 11 is advantageously a metallic material formed from thin, woven or nonwoven, wires of a few tens of microns the flexibility of which allows said metallic material to follow the shapes of the first-ply mold 20.

Depending on the electromagnetic properties of the first material 11, said first material is retained on the first-ply mold 20 by means of a magnetic field and/or an electrical potential difference, said first-ply mold being produced so that the wanted magnetic field, and/or the wanted electrical potential difference, i.e. that required to ensure the first material is retained on the first-ply mold while closely following the shape of said first-ply mold, is produced on its surface.

The first material 11 may also be retained, conjointly or not with the magnetic field and/or the potential difference, by mechanical means such as clamps for example (not shown). Specifically, mechanical clamping alone may prove to be sufficient to place the first material against the first-ply mold 20 in particular if the shape of said first-material mold is exclusively convex.

In a second step 112 of the production of the first ply 10, fine resin-powder particles of the second material 12 are deposited on the first material. The second material is for example deposited by electrostatic spraying.

The spraying is for example carried out using a spray gun and a solution in dispersion of the resin powder if necessary.

The second material 12 is deposited in a sufficient amount to ensure, in the subsequent steps of the process, binding of the fibers of a first layer of the thermoplastic composite of the part despite the shear forces generated during the laying of this first layer, the first layer being laid while being deformed to closely follow the shape of the tool and to orient the fibers in the desired directions.

The spraying is for example carried out using a spray gun 21 and a solution in dispersion of the resin powder if necessary.

In a third step 113 of the production of the first-ply 10, the first-ply mold 20, on which are deposited the first material 11, which is retained closely against the mold by electrostatic or magnetic forces and/or forces generated by the potential difference, and/or by mechanical clamping, and the second material 12, which is deposited in powder form on the first material, is subjected to a temperature increase, for example in a heating device 22, for example an infrared oven, or an air oven, or an autoclave, to raise the particles of the second thermoplastic-resin material 12 above their melting point and glass transition temperature, this causing the second material to adhere to the first material.

When the second material 12 has bonded to the first material 11, the temperature is returned to room temperature.

In a fourth step 114 of the production of the first ply, the first ply 10 is demolded and separated from the first-ply mold 20 after the electromagnetic field of the mold and/or the potential difference and/or the clamps retained up to the third step 113 have been released and if needs be reversed.

At the end of the first step 110 of the process, a hard first ply 10 of the first material impregnated with the second material is thus formed.

It will be noted that the obtained first ply 10 has a small thickness, substantially the thickness of the wires or of the metal sevens of the first material, but that nonetheless, despite the fact that the first ply is not very stiff because of its small thickness, the static shape thereof remains the shape acquired in the first-ply mold because of the resin of the second material heated to a melting point.

The metallic material of the wires of the first material 11 is chosen from materials having suitable magnetic properties: a good magnetic permeability and/or a high coercive field and/or a magnetization saturation for example, properties generally obtained with ferromagnetic materials. When it is desired to at least partially produce the clamping with a potential difference, the first material is chosen from electrically conductive materials so as to be able to foe brought to and maintained at a desired electrical potential and to make it possible to maintain an electrical potential difference between, on the one hand, the first element 10 and, on the other hand, the tool 30 and if needs be the first-ply mold 20.

In a second step 120 for producing the thermoplastic composite part, the first ply 10 produced in the first step 110 is laid on a tool 30 for molding the part to be produced.

The first ply 10 is retained on the surface of the tool 30 by means of a magnetic field or, for its electrically conductive portion, an electrical potential difference between said tool and said first ply, the tool being produced from a ferromagnetic material so as to produce the magnetic field on its surface and/or from an electrically conductive material to be maintained at the wanted electrical potential difference required to ensure the first ply 10 is retained closely following the shape of said tool.

The tool is for example produced from a steel or an alloy such as an Invar®.

If needs be, clamps hold the first ply on the tool 30 in particular on the edges of said tool.

In a third step 130 for producing the thermoplastic composite part, a first thermoplastic composite layer 13 of the part is laid on the first ply 10 maintained on the tool 30 and the other thermoplastic composite layers are laid in successive layers and consolidated using a known method, for example by means of a laying head 31, until the number of plies wanted for the part is obtained.

During the laying of the thermoplastic composite layers, the magnetic field or potential difference ensuring the first ply 10 is retained on the tool 30 is maintained so that, even in concave zones of the tool, the successive thermoplastic composite layers that are applied and that adhere directly or indirectly to the first ply perfectly follow the shape of the tool.

In a fourth step 140 for producing the thermoplastic composite part, the thermoplastic composite part produced is demolded and separated from the tool 30 after the electromagnetic field of the tool, and/or the electrical potential difference between the tool and the first ply that is incorporated in the part at this stage of the process, and/or the clamps, which were retained during the deposition of the successive thermoplastic composite layers of the part, have been released and if needs be reversed.

According to various variants of the process such as just described in a first mode of implementation, the process may be adapted depending on constraints related to the shape of the part to be produced or to the materials implemented.

Thus, the first material of the first ply 10 may be formed by one or more layers of a magnetic metal material. For example from nickel, silver, ferritic stainless steel.

The first material 10 may be deposited on the first-ply mold 20 in the form of wires in webs, wovens, knits, mats or even of a powder.

When a plurality of widths are juxtaposed on the first-ply mold 20, preferably two neighboring widths are placed with a slight overlap in order to avoid interstitial zones that, including only resin, could form a fragile zone in the first ply.

The first material 11 may be deposited on the first-ply mold 20 in the form of wires in webs, wovens, knits, mats or even of a powder.

The area density of first material 11 is advantageously comprised between 20 g/m$^2$ and 150 g/m$^2$.

Thus, according to one method of implementation, the first ply 10 that must be deposited on the tool 30 is produced in a plurality of portions that are juxtaposed on the tool.

This method proves to be advantageous when the first ply 10 is of such a large size that it would be difficult to handle a first ply made up of a single element without running the risk of damaging said first ply, and/or when the shape of the first ply is complex with concave zones and convex zones, clever cutting of the ply allowing, in the latter case, first-ply portions essentially having a simple curvature able to foe produced on convex molds to be produced.

Thus, according to one method of implementation of the first step 110 of the manufacture of the first ply 10, the second step 112 of depositing the second material 12 on the first material 11 is carried out before the first step III, the first material deposited on the first-ply mold 20 then already including the thermoplastic-resin powder of the second material.

Advantageously, the complex formed by the first material and the thermoplastic powder of the second material is produced in an upstream step.

The process thus allows a thermoplastic composite part to be produced with a first ply that is perfectly clamped to the tool, while ensuring that the resin of the first ply does not adhere to the tool, while avoiding the need for suction techniques that require seal-tight plies and that do not guarantee a homogenous pressure over the surface of the tool, and while avoiding use of the complex and expensive solution that is a counter-mold.

What is claimed is:

1. A process for producing a thermoplastic composite part, the process comprising:
   preforming a first ply to match a shape of a tool wherein the first ply includes a first material having electromagnetic properties so as to experience an attractive force when it is subjected to at least one of a magnetic field, or to an electrical potential difference, and a second material comprised of a thermoplastic resin that is chemically compatible with a thermoplastic resin of a thermoplastic composite layer;
   laying the first ply on the tool;
   retaining the first ply on the tool by at least one of the effect of a magnetic field established at a level of said tool, or of an electrical potential difference with said tool; and
   depositing the thermoplastic composite layer, including the thermoplastic resin of the thermoplastic composite layer, on the first ply after the first ply is laid on the tool, wherein the second material of the first ply is chemically compatible with the thermoplastic resin of the thermoplastic composite layer in order to adhere with the thermoplastic resin of the thermoplastic composite layer.

2. The process as claimed in claim 1, wherein preforming the first ply includes subjecting the first material and the second material, which is deposited on said first material in the form of a thermoplastic-resin powder, to a step in which temperature is increased above a melting point and glass transition temperature of the thermoplastic-resin powder, while being retained on a first-ply mold, the shape of said first-ply mold being a counterpart of the tool.

3. The process as claimed in claim 2, wherein the first material is deposited on the first-ply mold in a first step and, in a second step, the second material is deposited by spraying the thermoplastic-resin powder onto the first material deposited on said first-ply mold.

4. The process as claimed in claim 1, wherein the first material mainly consists of woven or nonwoven wires and/or of mats, and/or of powders, that are deposited to form a layer or a plurality of superposed layers of said first material.

5. The process as claimed in claim 2, wherein the first material is deposited on the first-ply mold in widths juxtaposed with a minimum overlap to avoid a gap between the neighboring edges of two juxtaposed widths.

6. The process as claimed in claim 1, wherein the second material is deposited on the first material by electrostatic spraying.

7. The process as claimed in claim 1, wherein the first material is formed from a ferromagnetic material such as a steel, a ferritic stainless steel or a nickel-containing alloy.

8. The process as claimed in claim 1, wherein the first ply is produced in at least two portions that are juxtaposed on the tool when the first ply is laid on said tool.

9. The process as claimed in claim 8, wherein the at least two portions of the first ply are defined so as each to be produced on partial first-ply molds of mainly convex shape.

10. The process as claimed in claim 2, wherein the first material is clamped to the first-ply mold, in the step of manufacturing said first ply, by the effect of a magnetic field established at the level of said first-ply mold, and/or of an electrical potential difference with said first-ply mold.

11. The process as claimed in claim 1, wherein the first ply is retained clamped on the tool by the effect of at least one of a magnetic field established at the level of said tool, or of an electrical potential difference with said tool, during the depositing of the thermoplastic composite layer superposed on the first ply.

12. The process as claimed in claim 11, wherein the magnetic field, and/or the potential difference, established at the level of the tool is cancelled, and if needs be reversed, in a step of demolding the thermoplastic composite part produced on said tool.

* * * * *